United States Patent
Tiwari et al.

(10) Patent No.: US 9,392,509 B2
(45) Date of Patent: Jul. 12, 2016

(54) SYSTEMS AND TECHNIQUES FOR HANDOVER CONTROL

(71) Applicant: Nokia Solutions and Networks Oy, Espoo (FI)

(72) Inventors: Bindhya Vashini Tiwari, Vantaa (FI); Sheyam Lal Dhomeja, Espoo (FI); Devaki Chandramouli, Plano, TX (US)

(73) Assignee: Nokia Solutions and Networks Oy, Espoo (FI)

( * ) Notice: Subject to any disclaimer, the term of this patent is extended or adjusted under 35 U.S.C. 154(b) by 33 days.

(21) Appl. No.: 14/169,378

(22) Filed: Jan. 31, 2014

(65) Prior Publication Data

US 2015/0223122 A1 Aug. 6, 2015

(51) Int. Cl.
*H04W 4/00* (2009.01)
*H04W 36/00* (2009.01)
*H04W 36/10* (2009.01)
*H04W 60/04* (2009.01)
*H04W 76/04* (2009.01)

(52) U.S. Cl.
CPC ...... *H04W 36/0083* (2013.01); *H04W 36/0011* (2013.01); *H04W 36/10* (2013.01); *H04W 60/04* (2013.01); *H04W 76/045* (2013.01)

(58) Field of Classification Search
USPC .......... 370/242–310, 328–338; 455/418–423, 455/450–553
See application file for complete search history.

(56) References Cited

U.S. PATENT DOCUMENTS

| | | | |
|---|---|---|---|
| 7,969,924 B2 * | 6/2011 | Young et al. | 370/311 |
| 8,223,697 B2 * | 7/2012 | Dwyer et al. | 370/328 |
| 8,265,034 B2 * | 9/2012 | Islam et al. | 370/331 |
| 8,797,934 B2 * | 8/2014 | Hsu | 370/311 |
| 8,965,372 B2 * | 2/2015 | Sharma et al. | 455/436 |
| 8,983,532 B2 * | 3/2015 | Arzelier et al. | 455/553.1 |
| 9,037,167 B2 * | 5/2015 | Islam et al. | 455/458 |
| 2009/0086667 A1 | 4/2009 | Sitomaniemi et al. | |
| 2012/0002650 A1 * | 1/2012 | Yanagisako | 370/338 |
| 2014/0220981 A1 * | 8/2014 | Jheng et al. | 455/437 |

FOREIGN PATENT DOCUMENTS

WO  WO 2011/163405 A1  12/2011
WO  WO 2013/110543 A1  8/2013

OTHER PUBLICATIONS

3GPP TS 24.008 V12.3.0; "3$^{rd}$ Generation Partnership Project; Technical Specification Group Core Network and Terminals; Mobile radio interface Layer 3 specification; Core network protocols; Stage 3 (Release 12)"; Sep. 2013; whole document (683 pages).

(Continued)

*Primary Examiner* — Man Phan
(74) *Attorney, Agent, or Firm* — Harrington & Smith (57) ABSTRACT

Systems and techniques for packet switched connection management. Upon a handover/cell change request with change of routing area code, an examination is made of parameters associated with a user equipment affected by the request for indications that the user equipment is engaged in a packet switched connection. Conditions associated with the handover/cell change request to determine if the packet switched connection should be released. If conditions associated with the handover/cell change request do not indicate that the packet switched connection should be released, release of the packet switched connection is inhibited.

17 Claims, 8 Drawing Sheets

```
802 ─────────────────────────
    UE requests handover/
    cell change with change
    of routing area code 800 ─┐
     │
     ▼
804 ─────────────────────────
    Conditions affecting a
    connection between the
    UE and a radio network
    controller are examined to
    determine if the presence of a
    packet switched connection is
    indicated 806 ─────────────────────────
    Depending on
    conditions identified,
    UE, RNC, or
    both, may inhibit release
    of packet switched
    connection
```

(56) References Cited

OTHER PUBLICATIONS

3GPP TS 24.008 V12.4.0 (Dec. 2013); 3rd Generation Partnership Project; Technical Specification Group Core Network and Terminals; Mobile radio interface Layer 3 specification; Core network protocols; Stage 3 (Release 12).

C1-141065; NSN; "PS signaling connection release"; 3GPP TSG-CT WG1 Meeting #86bis; Dubrovnik, Croatia, Mar. 31-Apr. 4, 2014.

* cited by examiner

SYSTEMS AND TECHNIQUES FOR HANDOVER CONTROL

TECHNICAL FIELD

The present invention relates generally to wireless network communication. More particularly, the invention relates to improved systems and techniques for serving radio network subsystem relocation during handover.

BACKGROUND

Efficiency in wireless network communication is an important objective, becoming more and more important as the number of users and their demands for service continue to increase. Network operators wish to minimize the infrastructure they must provide. In addition, the frequency bands dedicated to wireless network communication are a finite and valuable resource, and network operators are constantly working to use this resource efficiently in order to prevent the available frequencies from becoming oversaturated. No amount of infrastructure can compensate for the degradation caused by oversaturation of frequencies, because new infrastructure will simply introduce new competitors for the same frequency. Wireless communication involves significant use of frequencies for control signaling, and reduction of unnecessary control signaling can increase efficiency and reduce the load on available frequencies. One operation involving significant control signaling is handover, cell change, and other procedures involving the relocation of devices.

SUMMARY

In one embodiment of the invention, an apparatus comprises at least one processor and memory storing computer program code. The memory storing the computer program code is configured to, with the at least one processor, cause the apparatus to at least, upon a handover/cell change request with change of routing area code, examine parameters associated with a user equipment affected by the request for indications that the user equipment is engaged in a packet switched connection, examine conditions associated with the handover/cell change request to determine if the packet switched connection should be released, and, if conditions associated with the handover/cell change request do not indicate that the packet switched connection should be released, inhibit release of the packet switched connection.

In another embodiment of the invention, a method comprises, upon a handover/cell change request with change of routing area code, examining parameters associated with a user equipment affected by the request for indications that the user equipment is engaged in a packet switched connection, examining conditions associated with the handover/cell change request to determine if the packet switched connection should be released and, if conditions associated with the handover/cell change request do not indicate that the packet switched connection should be released, inhibiting release of the packet switched connection.

In another embodiment of the invention, a computer readable medium stores a program of instructions. Execution of the program of instructions by a processor configures an apparatus to at least, upon a handover/cell change request with change of routing area code, examine parameters associated with a user equipment affected by the request for indications that the user equipment is engaged in a packet switched connection, examine conditions associated with the handover/cell change request to determine if the packet switched connection should be released, and, if conditions associated with the handover/cell change request do not indicate that the packet switched connection should be released, inhibit release of the packet switched connection.

DETAILED DESCRIPTION

Embodiments of the present invention address serving radio network subsystem relocation during ongoing packet switched calls, particularly in cellular wireless network systems such as third generation partnership project (3GPP), 3GPP universal mobile terrestrial service (UMTS) and other systems designed and operating according to 3GPP specifications. In exemplary systems according to 3GPP specifications, Radio Network Controllers are referred to as RNCs and user devices are referred to as user equipments (UE). UEs may be simultaneously involved in communication using any number of connections, some of which need not be broken when the UE relocates. If a connection is broken and restarted when there is no need, the signaling performed to break and restart the connection wastes resources.

Under the currently defined 3GPP standards, when a UE in a Cell_FACH (cell forward access channel), Cell_PCH (cell paging channel), or URA_PCH (universal terrestrial radio access network paging channel) state moves from one radio network control (RNC) cell to another RNC cell in the RNC border area, the source RNC may trigger a serving radio network system (SNRS) relocation procedure upon recognition of a CELL UPDATE from a Drift RNC. In the Cell_DCH (cell dedicated channel) state, the source RNC may trigger a UE involved or UE not involved relocation depending on whether the UE has a radio link from the Drift RNC in its active set or not.

After the successful completion of an SRNS relocation procedure, the UE may initiate a Routing Area Update procedure. If the Routing Area Update is triggered only due to change in the stored radio access channel, then the UE may set a "no follow-on request pending" indicator flag on the ROUTING AREA UPDATE REQUEST (as described in 3GPP TS 24.008).

According to 3GPP TS 24.008, a UE may set a "follow-on request pending" flag if the UE wants to prolong a packet switched (PS) connection for a pending connection management (CM) request. Hence, if the UE is engaged in an ongoing PS call and sends a ROUTING AREA UPDATE request, it does not need to inquire about ongoing PS call activity. From the perspective of the network, the network cannot release the PS connection if it receives the ROUTING AREA UPDATE REQUEST message with the "follow-on request pending" flag set. The network can indicate this to the UE by setting "no follow on proceed" in the ROUTING AREA UPDATE ACCEPT message. The following is an excerpt from 3GPP TS 24.008:

In Iu mode, if the network wishes to prolong the PS signalling connection (for example, if the mobile station has indicated "follow-on request pending" in ROUTING AREA UPDATE REQUEST message) the network shall indicate the "follow-on proceed" in the ROUTING AREA UPDATE ACCEPT message. If the network wishes to release the PS signalling connection, the network shall indicate "no follow-on proceed" in the ROUTING AREA UPDATE ACCEPT message.

When setting the follow-on request pending/follow-on proceed flag, the non-access stratum (NAS) layer in the UE and in the network, respectively, do not need to take into account activity of an ongoing PS call. It has been observed in the field that after an SRNS relocation procedure, a UE will send a SIGNALING CONNECTION RELEASE INDICATION message to release the PS and the entire Iu connection. This is because of the expiration of timer T3340 in the UE. The timer T3340 is set when the UE receives a ROUTING AREA UPDATE ACCEPT message from the network with a "no follow-on proceed" flag set. The network may set "no follow-on proceed" if the UE has not indicated, by setting a "follow-on request pending" flag, that the PS connection is to be prolonged, and the network has no procedure of its own to be initiated.

Thus, in conventional operations, after every SRNS relocation procedure a UE will initiate release of the PS connection even when there an ongoing PS call is underway but there was no CM request pending during the initiation of the Routing Area Update procedure. This is completely unnecessary functionality. Systems and techniques according to one or more embodiments of the invention examine conditions suggesting the presence of a PS call and if such conditions exist, inhibit release of a PS connection when there is no need for such release.

Figure 1:
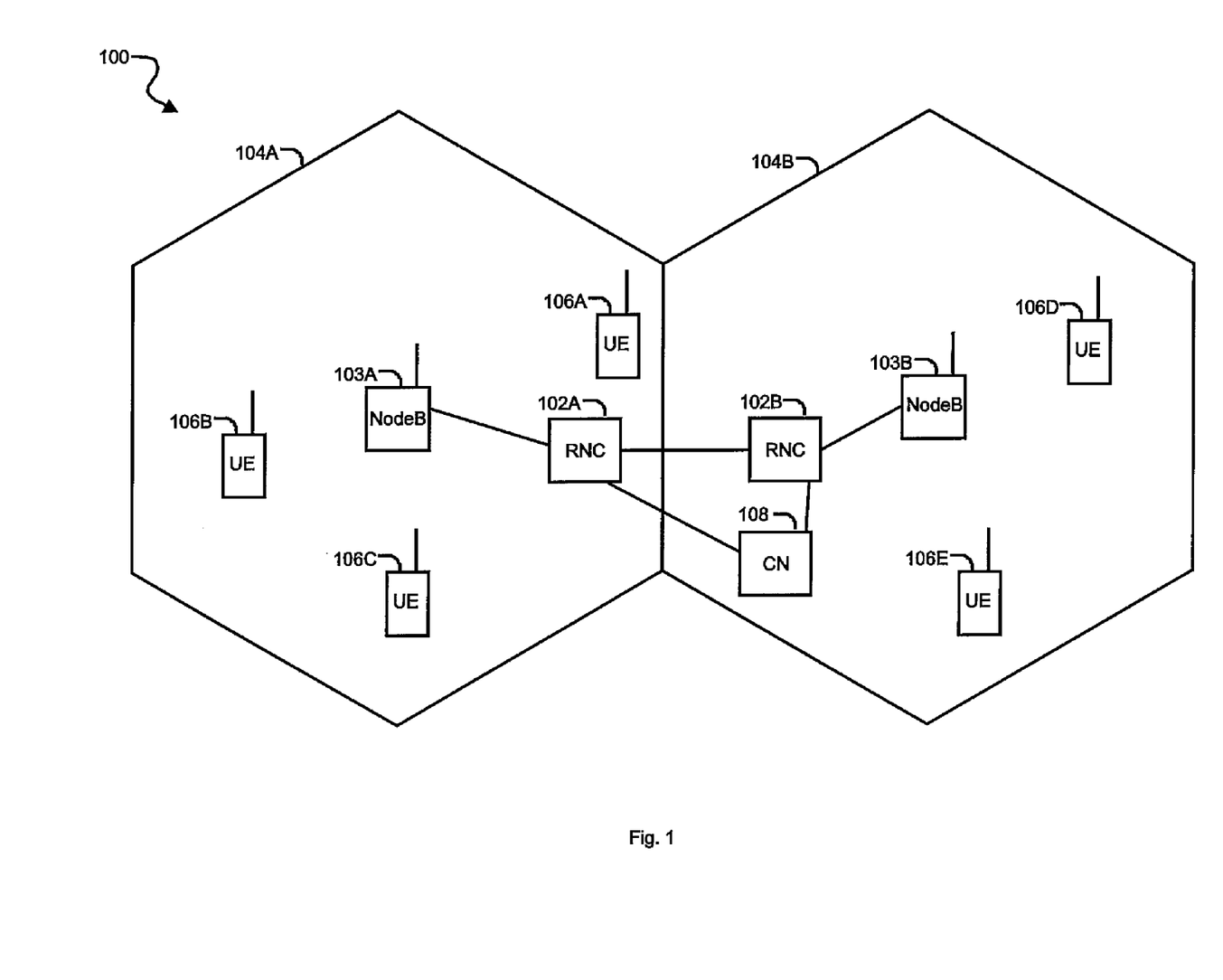
FIG. 1 illustrates a wireless network according to an embodiment of the invention.

FIG. 1 illustrates a wireless network 100 according to an embodiment of the present invention. The network comprises a plurality of Radio Network Controllers, implemented as RNCs 102A and 102B, suitably controlling base stations implemented, for example, as NodeBs 103A and 103B, with the coverage area of the NodeBs 103A and 103B defining cells 104A and 104B, respectively. In the present exemplary embodiment, the cells 104A and 104B serve UEs 106A-106E. The radio network controllers 102A and 102B are connected to a core network (CN) 108. The radio network controllers 102A and 102B may communicate with the UEs served by the cells in which they operate, suitably through the NodeBs 103A and 103B, which provide a wireless connection between the RNCs 102A and 102B and the various UEs.

In the example given here, the UEs 106A and 106B are engaged in a packet switched connection. The UE 106A has moved to a fringe coverage area and is initiating a switch from the cell 104A to the cell 104B, that is, a release of the connection to the RNC 102A and establish a connection to the RNC 102B. The UE 106A therefore performs a ROUTING AREA UPDATE REQUEST. A packet switched call is underway, so the non-access stratum (NAS) layer of the UE prepares to set a follow-on request pending flag. The NAS layer checks with the access stratum (AS) layer to determine if there is an ongoing active packet switched (PS) data transfer. If there is an ongoing PS data transfer or a PS radio access bearer (RAB) already established in the radio resource control (RRC) connection, then the UE sets a follow-on-request pending flag in the ROUTING AREA UPDATE REQUEST.

Upon the expiration of a T3340 timer (defined by relevant 3GPP technical specifications), before the UE 106A initiates a PS connection release it checks with the AS to determine if there is an active PS data connection. If there is an ongoing PS call, then the UE should not initiate a signaling connection release indication (SCRI) without cause to abort the PS connection. Such an approach is also applicable when the CN 108) has set "no follow-on proceed" in the ROUTING AREA UPDATE ACCEPT by the UE has a procedure set to be triggered by expiration of the T3340 timer.

In one or more embodiments of the invention, when the CN (in this case the CN 108) coordinating PS receives the ROUTING AREA UPDATE REQUEST, it will check to determine if an established PS RAB is present in the existing RRC connection. If a PS RAB is present, the SGSN always sets a "follow-on proceed" in the ROUTING AREA UPDATE ACCEPT message to the UE.

In a further embodiment, the RRC SIGNALING CONNECTION RELEASE INDICATION message specifies the trigger message for the SCRI from the UE. In that case, the radio network controller can examine the trigger message and determine if it should ignore the SCRI during ongoing PS procedures, or if it is appropriate to release the PS RAB and signaling connection. Indication of the trigger may be implemented, for example, by including a cause value in the message RRC SIGNALING CONNECTION RELEASE INDICATION (for example, NASProcedureCompletion). In addition or as an alternative, the UE (such as the UE 106A) may set a preferred RRC state in the SCRI message. The network may take this preference into account or ignore it, depending on the network configuration.

Figure 2:
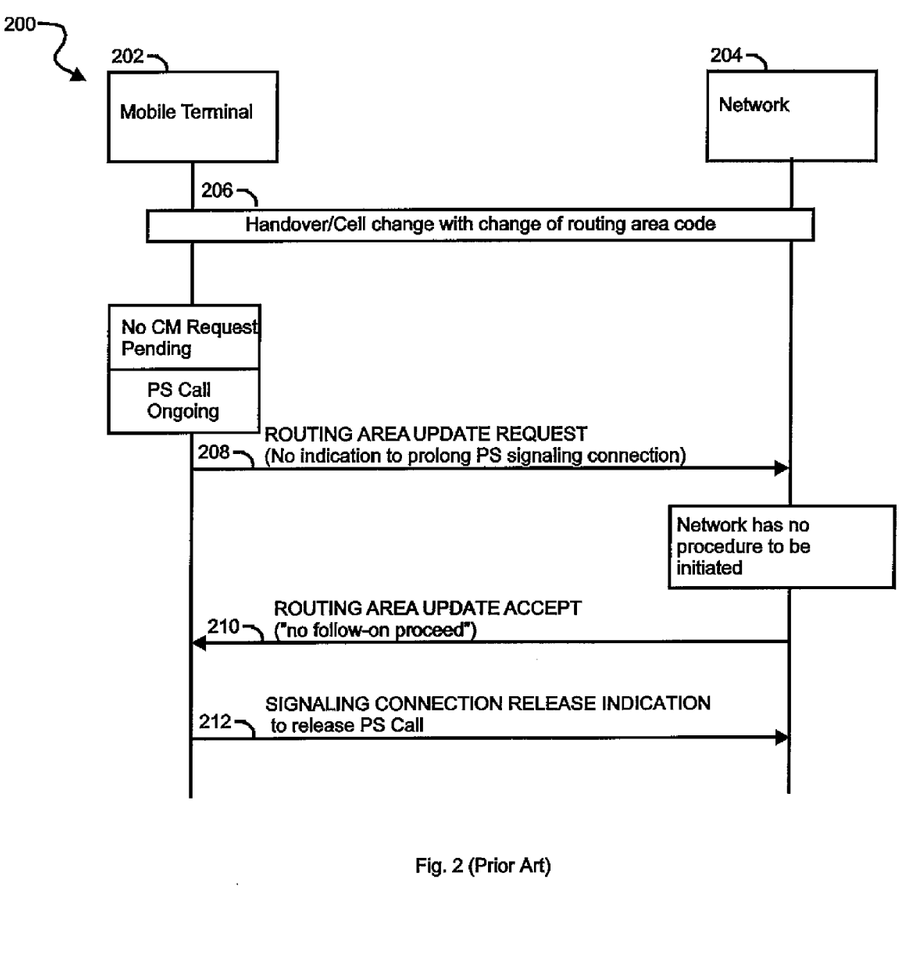
FIG. 2 illustrates prior-art operations by and signaling between wireless network components.

FIG. 2 illustrates prior-art signaling and operations undertaken by a mobile terminal 202 and a network 204 serving the mobile terminal. The mobile terminal 202 initiates a handover/cell change 206 with change of routing area code in a message to the network 204. The mobile terminal 202 is aware that no CM request is pending and a PS call is ongoing. The mobile terminal 202 sends to the network 204 a ROUTING AREA UPDATE REQUEST message 208 without an indication to prolong the PS signaling connection. The network 204 has no specified procedure to be initiated, and responds by sending to the mobile terminal 202 a ROUTING AREA UPDATE ACCEPT 210 with "no follow-on proceed" set. A T3340 timer is initiated and the mobile terminal sends to the network 204 a SIGNALING CONNECTION RELEASE INDICATION 212 to release the PS call.

Figure 3:
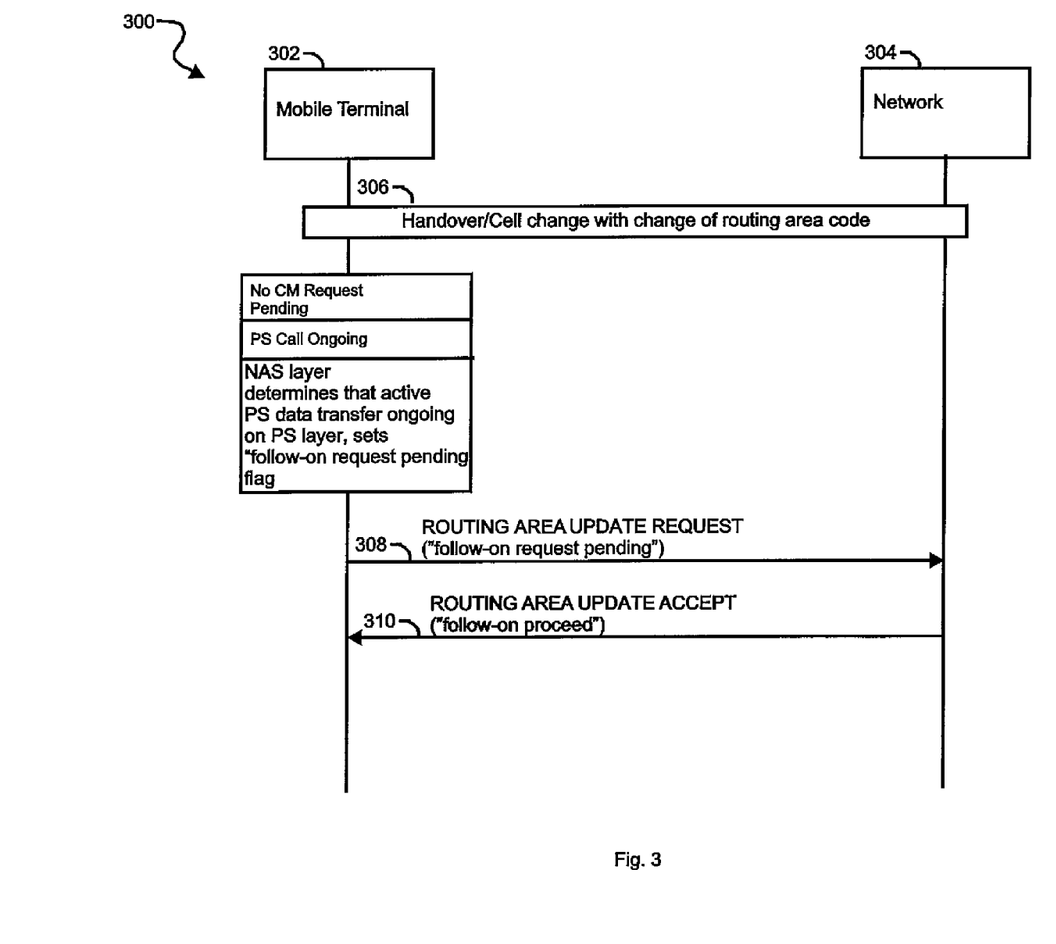
FIGS. 3-6 illustrate operations by and signaling between wireless network components, according to embodiments of the present invention.

FIG. 3 illustrates signaling and operations 300 undertaken by a mobile terminal 302 and a network 304 serving the mobile terminal. The mobile terminal 302 initiates a handover/cell change with change of routing area code 306 in a message to the network 304. The mobile terminal 302 is aware that no CM request is pending and a PS call is ongoing, and the NAS layer checks to determine if an active PS data transfer is proceeding on the AS layer. In the example presented here, such a transfer is proceeding, so the NAS layer sets a "follow-on request pending" flag. The mobile terminal 302 sends to the network 304 a ROUTING AREA UPDATE REQUEST message 308. The message has a "follow-on request pending" flag set. The network 304 responds by sending to the mobile terminal 302 a ROUTING AREA UPDATE ACCEPT message 310 with a "follow-on proceed" flag set.

Figure 4:
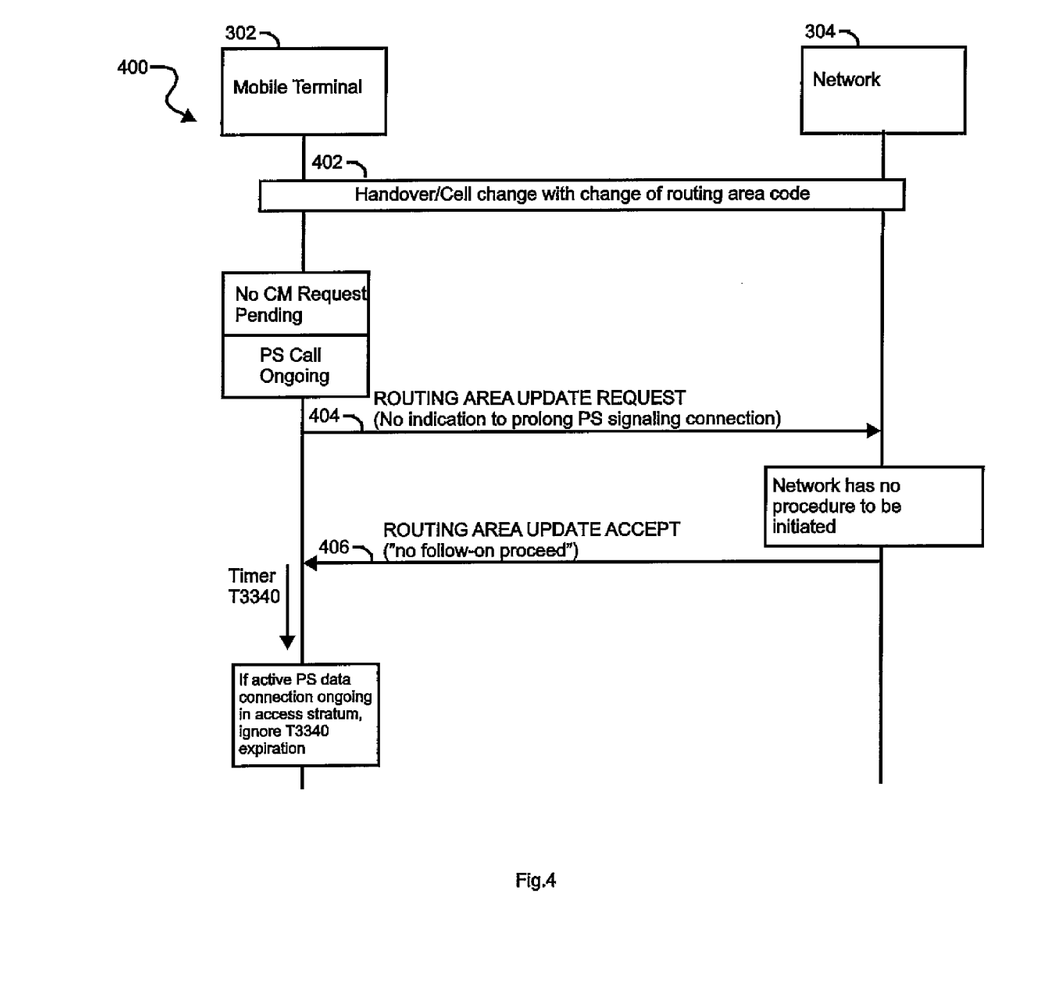

FIG. 4 illustrates signaling and operations 400 undertaken by a mobile terminal 302 and a network 304 serving the mobile terminal 302. The mobile terminal 302 initiates a handover/cell change with change of routing area code 402 in a message to the network 304. The mobile terminal 302 is aware that no CM request is pending and a PS call is ongoing. The mobile terminal 302 sends to the network 304 a ROUTING AREA UPDATE REQUEST message 404 without an indication to prolong the PS signaling connection. The network 304 is aware that it has no procedure of its own to be initiated, and sends to the mobile terminal a ROUTING AREA UPDATE ACCEPT message 406 with a "no follow-on proceed" flag set. The mobile terminal 302 initiates a T3340 timer. In the present example, an active PS data connection is ongoing in the access stratum and the expiration of the T3340 timer is ignored.

Figure 5:
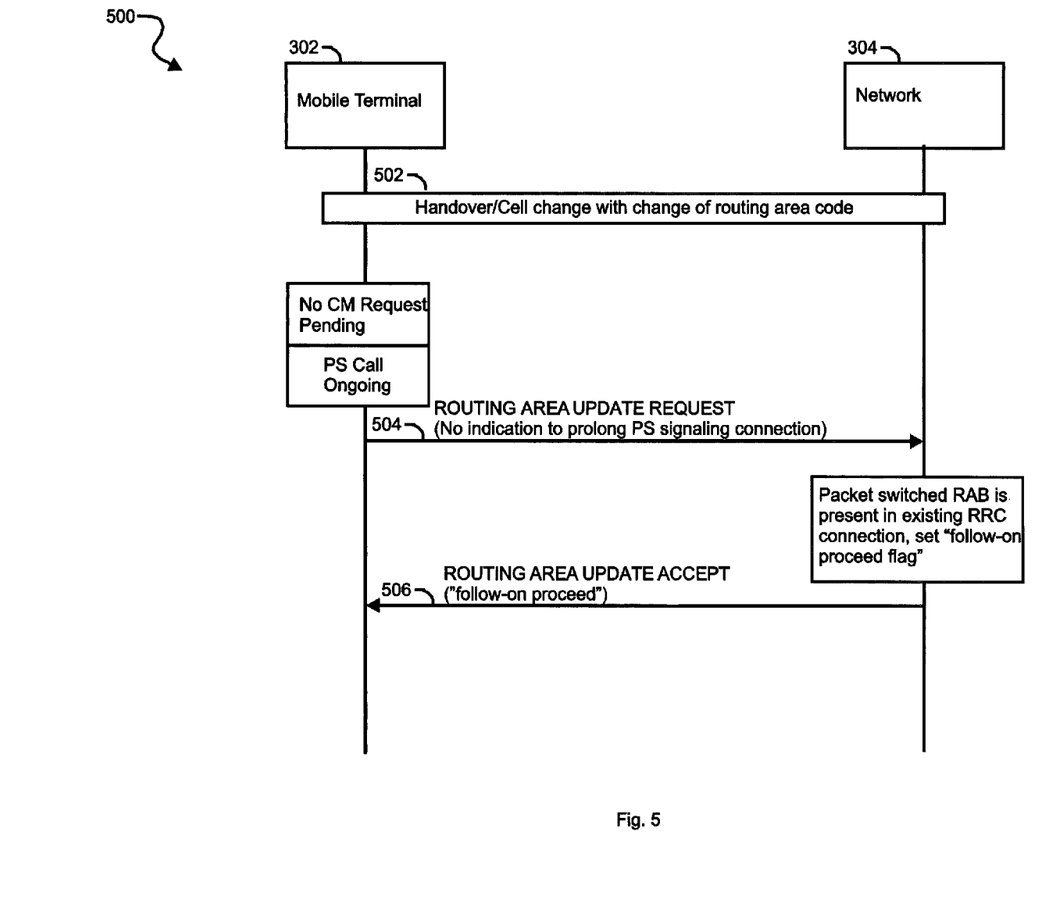

FIG. 5 illustrates signaling and operations 500 undertaken by a mobile terminal 302 and a network 304 serving the mobile terminal 302. The mobile terminal 302 initiates a handover/cell change with change of routing area code 502 in a message to the network 304. The mobile terminal 302 is aware that no CM request is pending and a PS call is ongoing. The mobile terminal 302 sends to the network 304 a ROUTING AREA UPDATE REQUEST message 504 without an indication to prolong the PS signaling connection. A packet switched radio access bearer is present in the existing radio resource control connection, and the network sets a "follow-on proceed flag". The network 304 sends to the mobile terminal a ROUTING AREA UPDATE ACCEPT message 404506 with a "follow-on proceed" flag set.

Figure 6:
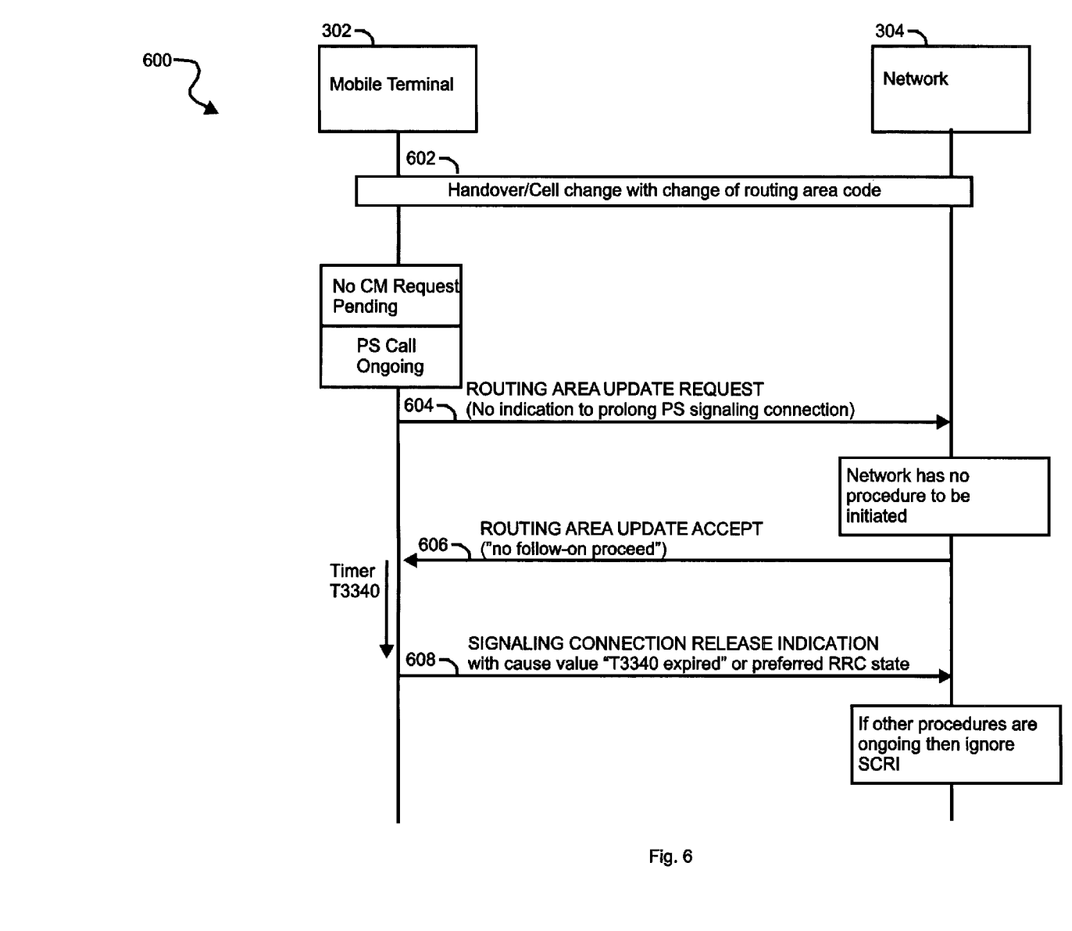

FIG. 6 illustrates signaling and operations 400 undertaken by a mobile terminal 302 and a network 304 serving the mobile terminal 302. The mobile terminal 302 initiates a handover/cell change 602 with change of routing area code in a message to the network 304. The mobile terminal 302 is aware that no CM request is pending and a PS call is ongoing. The mobile terminal 302 sends to the network 304 a ROUTING AREA UPDATE REQUEST message 604 without an indication to prolong the PS signaling connection. The network 304 is aware that it has no procedure of its own to be initiated, and sends to the mobile terminal a ROUTING AREA UPDATE ACCEPT message 606 with a "no follow-on proceed" flag set. The mobile terminal 302 initiates a T3340 timer. In the present example, upon expiration of the T3340 timer, the mobile terminal 302 sends to the network 304 a SIGNALING CONNECTION RELEASE INDICATION (SCRI) message 608 including a cause value "timer expired" and may additionally or alternatively include an indication of a preferred RRC state. The network 304 examines the cause value included in the SCRI message 608 and determines if the request presented by the message 608 should be followed. In the present example, other procedures are ongoing and the network 304 is configured such that a timer expiration will not cause release of the connection, so the SCRI is ignored. Under other conditions, the SCRI request may be granted or a specified RRC may be set, with the particular procedure to be followed depending on design choices.

Figure 7:
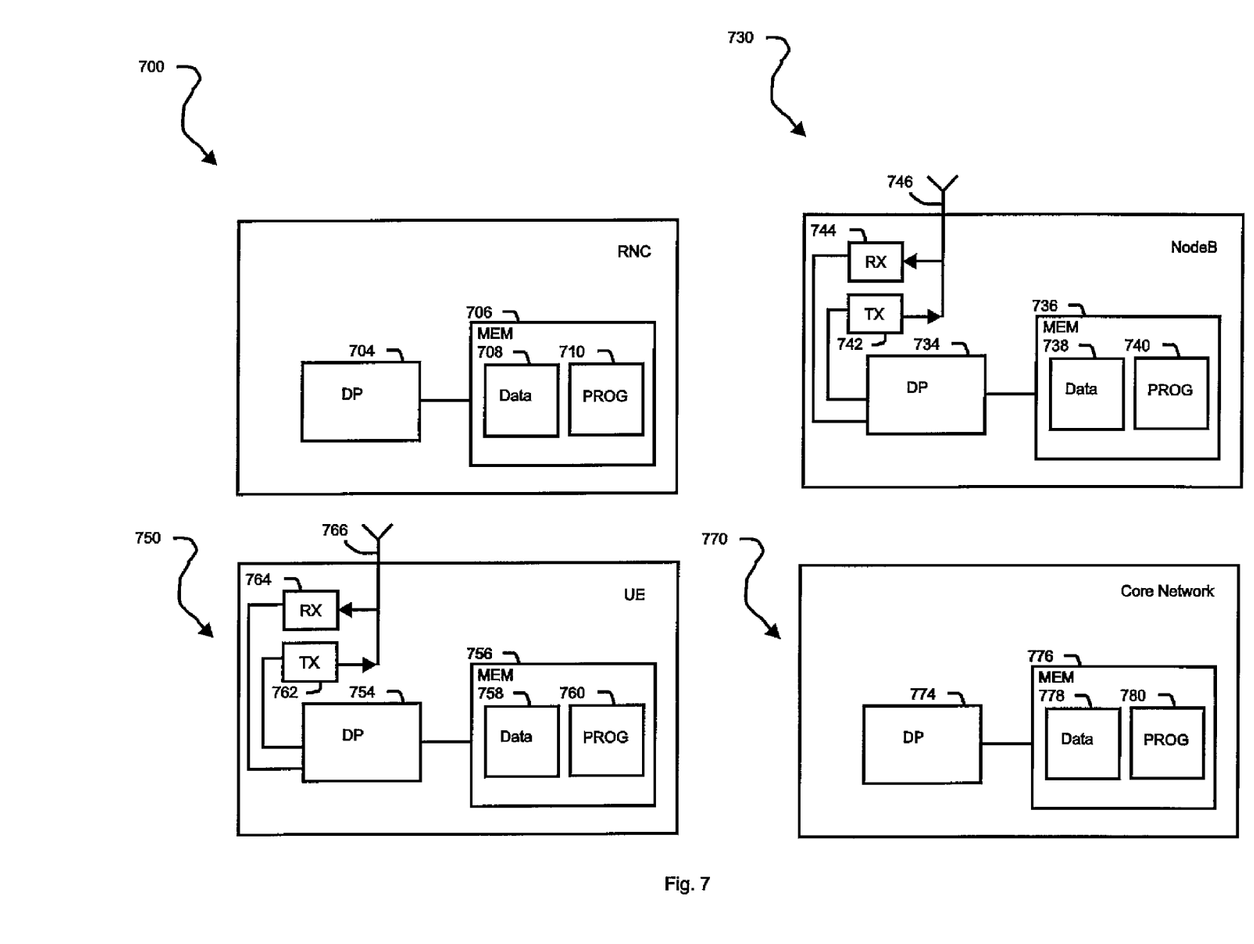
FIG. 7 illustrates elements for carrying out embodiments of the present invention.

Reference is now made to FIG. 7 for illustrating a simplified block diagram of a RNC 700, a NodeB 730, a user device, such as a UE 750, and a core network 770, suitable for use in practicing exemplary embodiments of this invention. In FIG. 7 an apparatus, such as the RNC 700, is adapted for communication with other apparatuses having wireless communication capability, such as the UE 750, suitably controlling a NodeB such as the NodeB 730 and communicating with the UE 750 through the NodeB 730.

The RNC 700 includes processing means such as at least one data processor (DP) 704, storing means such as at least one computer-readable memory (MEM) 706 storing data 708 and at least one computer program (PROG) 710 or other set of executable instructions. The NodeB 730 includes processing means such as at least one data processor (DP) 734, storing means such as at least one computer-readable memory (MEM) 736 storing data 738 and at least one computer program (PROG) 740 or other set of executable instructions, as well as communicating means such as a transmitter TX 742 and a receiver RX 744 for bidirectional wireless communications with the UE 750 via one or more antennas 746.

The UE 750 includes processing means such as at least one data processor (DP) 754, storing means such as at least one computer-readable memory (MEM) 756 storing data 758 and at least one computer program (PROG) 760 or other set of executable instructions, communicating means such as a transmitter TX 762 and a receiver RX 764 for bidirectional wireless communications with the RNC 700 via one or more antennas 766.

The core network 770 includes processing means such as at least one data processor (DP) 774, storing means such as at least one computer-readable memory (MEM) 776 storing data 778 and at least one computer program (PROG) 780 or other set of executable instructions.

At least one of the PROGs 710 in the RNC 700 is assumed to include a set of program instructions that, when executed by the associated DP 704, enable the device to operate in accordance with the exemplary embodiments of this invention, as detailed above. In these regards the exemplary embodiments of this invention may be implemented at least in part by computer software stored on the MEM 706, which is executable by the DP 704 of the RNC 700, or by hardware, or by a combination of tangibly stored software and hardware (and tangibly stored firmware). Similarly, at least one of the PROGs 760 in the UE 750 is assumed to include a set of program instructions that, when executed by the associated DP 754, enable the device to operate in accordance with the exemplary embodiments of this invention, as detailed above. Similarly, at least one of the PROGs 780 in the core network 770 is assumed to include a set of program instructions that, when executed by the associated DP 774, enable the device to operate in accordance with the exemplary embodiments of this invention, as detailed above. In these regards the exemplary embodiments of this invention may be implemented at least in part by computer software stored on the MEM 776, which is executable by the DP 774 of the UE 780, or by hardware, or by a combination of tangibly stored software and hardware (and tangibly stored firmware). Electronic devices implementing these aspects of the invention need not be the entire devices as depicted at FIG. 1 or FIG. 7 or may be one or more components of same such as the above described tangibly stored software, hardware, firmware and DP, or a system on a chip SOC or an application specific integrated circuit ASIC.

In general, the various embodiments of the UE 750 can include, but are not limited to personal portable digital devices having wireless communication capabilities, including but not limited to cellular telephones, navigation devices, laptop/palmtop/tablet computers, digital cameras and music devices, and Internet appliances.

Various embodiments of the computer readable MEM 706, 736, 756, and 776 include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DP 704, 734, 754, and 774 include but are not limited to general purpose computers, special purpose computers, microprocessors, digital signal processors (DSPs) and multi-core processors.

Figure 8:
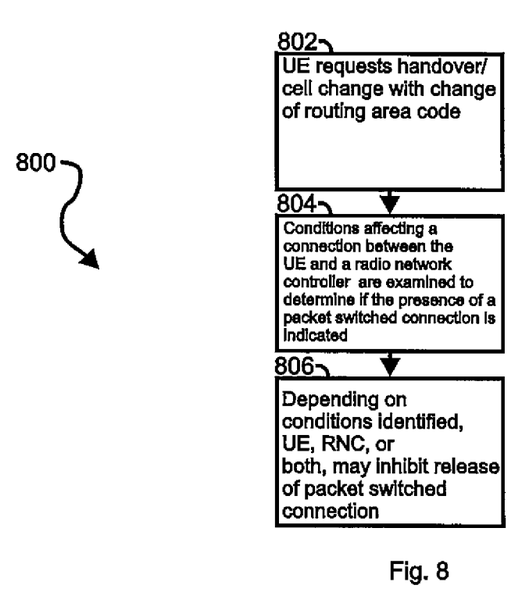
FIG. 8 illustrates a process according to an embodiment of the present invention.

FIG. 8 illustrates a process 800 according to an embodiment of the present invention. At block 802, a UE requests a handover/cell change with change of routing area code. At block 804, conditions affecting a connection between the UE and an RNC are examined to determine if the presence of a packet switched connection is indicated. Examples of such connections include the presence of an ongoing packet switched call, particularly the presence of an active packet switched data transfer, or the presence of a packet switch connection radio access bearer in an existing radio resource control connection. At block 806, depending on the specific conditions identified, the UE, the RNC, or both, may perform procedures and include signaling elements that cause inhibition of release of the packet switched connection. Such procedures and signaling elements may include, for example, including or not including in a routing area update message an indication to prolong the packet switched signaling connection, including or not including a "no follow-on proceed" indication in a routing area update accept message, responding to ignoring a signaling connection release indication, or responding to or ignoring a T3340 timer. Factors taken into account in determining whether to inhibit release of the packet switched connection may include whether or not a network has its own procedure to be initiated.

While various exemplary embodiments have been described above it should be appreciated that the practice of the invention is not limited to the exemplary embodiments shown and discussed here. Various modifications and adaptations to the foregoing exemplary embodiments of this invention may become apparent to those skilled in the relevant arts in view of the foregoing description.

Further, some of the various features of the above non-limiting embodiments may be used to advantage without the corresponding use of other described features.

The foregoing description should therefore be considered as merely illustrative of the principles, teachings and exemplary embodiments of this invention, and not in limitation thereof.

We claim:

1. An apparatus comprising:
   at least one processor;
   memory storing computer program code;
   wherein the memory storing the computer program code is configured to, with the at least one processor, cause the apparatus to at least:
   at a radio network controller (RNC), upon a handover/cell change request with change of routing area code, examine parameters associated with a user equipment affected by the request for indications that the user equipment is engaged in a packet switched connection;
   examine conditions associated with the handover/cell change request to determine if the packet switched connection should be released, wherein conditions indicating that the packet switched connection should not be released comprise the presence of a packet switched radio access bearer in a radio resource control connection between a radio network controller (RNC) and the user equipment; and
   if conditions associated with the handover/cell change request do not indicate that the packet switched connection should be released, inhibit release of the packet switched connection, wherein inhibiting release of the packet switched connection comprises, if such a packet switched radio access bearer is present, responding to a ROUTING AREA UPDATE REQUEST with a ROUTING AREA UPDATE ACCEPT with a "follow-on proceed" flag set whether or not the ROUTING AREA UPDATE REQUEST includes an indication to prolong the packet switched signaling connection.

2. The apparatus of claim 1, wherein conditions indicating that the packet switched connection should not be released comprise the absence of a pending connection management request and the presence of an ongoing packet switched call.

3. The apparatus of claim 2, wherein conditions indicating that the packet switched connection should not be released further comprise the presence of an active packet switched data transfer on an access stratum layer of the wireless connection of the user equipment and wherein inhibiting release of the packet switched connection comprises setting a "follow-on request pending" flag in a ROUTING AREA UPDATE REQUEST transmitted by the user equipment.

4. The apparatus of claim 2, wherein inhibiting release of the packet switched connection comprises, if an active packet switched data connection is present in the access stratum layer of the wireless connection of the user equipment, ignoring expiration of a T3340 timer.

5. The apparatus of claim 1, wherein inhibiting release of the packet switched connection comprises ignoring a SIGNALING CONNECTION RELEASE INDICATION identified as caused by expiration of a T3340 timer.

6. The apparatus of claim 5, wherein the SIGNALING CONNECTION RELEASE INDICATION is ignored if network procedures have been initiated since the CN transmitted a ROUTING AREA UPDATE ACCEPT with "no follow-on proceed" to the user equipment.

7. A method comprising:
   upon a handover/cell change request with change of routing area code, examining parameters associated with a user equipment affected by the request for indications that the user equipment is engaged in a packet switched connection;
   examining conditions associated with the handover/cell change request to determine if the packet switched connection should be released, wherein conditions indicating that the packet switched connection should not be released comprise the presence of a packet switched radio access bearer in a radio resource control connection between a RNC and the user equipment; and
   if conditions associated with the handover/cell change request do not indicate that the packet switched connection should be released, inhibiting release of the packet switched connection, wherein inhibiting release of the packet switched connection comprises, if such a packet switched radio access bearer is present, causing the CN to respond to a ROUTING AREA UPDATE REQUEST with a ROUTING AREA UPDATE ACCEPT with a "follow-on proceed" flag set whether or not the ROUTING AREA UPDATE REQUEST includes an indication to prolong the packet switched signaling connection.

8. The method of claim 7, wherein conditions indicating that the packet switched connection should not be released comprise the absence of a pending connection management request and the presence of an ongoing packet switched call.

9. The method of claim 8, wherein conditions indicating that the packet switched connection should not be released further comprise the presence of an active packet switched data transfer on an access stratum layer of the wireless connection of the user equipment and wherein inhibiting release of the packet switched connection comprises setting a "follow-on request pending" flag in a ROUTING AREA UPDATE REQUEST transmitted by the user equipment.

10. The method of claim 8, wherein inhibiting release of the packet switched connection comprises, if an active packet switched data connection is present in the access stratum layer of the wireless connection of the user equipment, ignoring expiration of a T3340 timer.

11. The method of claim 7, wherein inhibiting release of the packet switched connection comprises causing the RNC to ignore a SIGNALING CONNECTION RELEASE INDICATION identified as caused by expiration of a T3340 timer.

12. The method of claim 11, wherein the SIGNALING CONNECTION RELEASE INDICATION is ignored if network procedures have been initiated since the CN transmitted a ROUTING AREA UPDATE ACCEPT with "no follow-on proceed" to the user equipment.

13. A non-transitory computer readable medium storing a program of instructions, execution of which by a processor configures an apparatus to at least:
  upon a handover/cell change request with change of routing area code, examine parameters associated with a user equipment affected by the request for indications that the user equipment is engaged in a packet switched connection;
  examine conditions associated with the handover/cell change request to determine if the packet switched connection should be released, wherein conditions indicating that the packet switched connection should not be released comprise the presence of a packet switched radio access bearer in a radio resource control connection between a radio network controller (RNC) and the user equipment; and
  if conditions associated with the handover/cell change request do not indicate that the packet switched connection should be released, inhibit release of the packet switched connection, wherein inhibiting release of the packet switched connection comprises, if such a packet switched radio access bearer is present, responding to a ROUTING AREA UPDATE REQUEST with a ROUTING AREA UPDATE ACCEPT with a "follow-on proceed" flag set whether or not the ROUTING AREA UPDATE REQUEST includes an indication to prolong the packet switched signaling connection.

14. The non-transitory computer readable medium of claim 13, wherein conditions indicating that the packet switched connection should not be released comprise the absence of a pending connection management request and the presence of an ongoing packet switched call.

15. The non-transitory computer readable medium of claim 14, wherein conditions indicating that the packet switched connection should not be released further comprise the presence of an active packet switched data transfer on an access stratum layer of the wireless connection of the user equipment and wherein inhibiting release of the packet switched connection comprises setting a "follow-on request pending" flag in a ROUTING AREA UPDATE REQUEST transmitted by the user equipment.

16. The non-transitory computer readable medium of claim 14, wherein inhibiting release of the packet switched connection comprises, if an active packet switched data connection is present in the access stratum layer of the wireless connection of the user equipment, ignoring expiration of a T3340 timer.

17. The non-transitory computer readable medium of claim 13, wherein inhibiting release of the packet switched connection comprises ignoring a SIGNALING CONNECTION RELEASE INDICATION identified as caused by expiration of a T3340 timer.

* * * * *